United States Patent
Alonso Alarcon et al.

(10) Patent No.: US 10,255,339 B2
(45) Date of Patent: Apr. 9, 2019

(54) DATA CHANGE CONTROLLER

(71) Applicant: Telefonaktiebolaget LM Ericsson (publ), Stockholm (SE)

(72) Inventors: Antonio Alonso Alarcon, Madrid (ES); Bo Åström, Stockholm (SE); David Castellanos Zamora, Madrid (ES); Jan Lemark, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 363 days.

(21) Appl. No.: 15/106,638

(22) PCT Filed: Dec. 23, 2013

(86) PCT No.: PCT/EP2013/077905
§ 371 (c)(1),
(2) Date: Jun. 20, 2016

(87) PCT Pub. No.: WO2015/096849
PCT Pub. Date: Jul. 2, 2015

(65) Prior Publication Data
US 2016/0335337 A1    Nov. 17, 2016

(51) Int. Cl.
*G06F 17/30* (2006.01)
*G06F 11/14* (2006.01)

(52) U.S. Cl.
CPC .... *G06F 17/30575* (2013.01); *G06F 11/1448* (2013.01); *G06F 11/1464* (2013.01);
(Continued)

(58) Field of Classification Search
CPC .......... G06F 17/30575; G06F 11/1448; G06F 11/1464; G06F 11/1469; G06F 11/1474;
(Continued)

(56) References Cited

U.S. PATENT DOCUMENTS

| | | | |
|---|---|---|---|
| 6,988,109 B2 * | 1/2006 | Stanley | G06F 17/30286 |
| 8,032,559 B2 | 10/2011 | Ring et al. | |
| 9,319,267 B1 * | 4/2016 | Buchko | H04L 41/0663 |
| 9,367,560 B1 * | 6/2016 | Ely | G06F 17/30174 |
| 2003/0016770 A1 * | 1/2003 | Trans | H04B 1/00 375/346 |

(Continued)

FOREIGN PATENT DOCUMENTS

EP    1 241 592 A2    9/2002

OTHER PUBLICATIONS

Transaction Monitor Resource Manager, IBM, 28 pages (Year: 1995).*

(Continued)

*Primary Examiner* — Noosha Arjomandi
(74) *Attorney, Agent, or Firm* — Patent Portfolio Builders, PLLC (57) ABSTRACT

A technique is disclosed for synchronizing first and second data sets stored in a data repository. A method includes triggering, by the data repository, in response to a commit order relating to an ongoing transaction requested by a client and instructing the data repository to apply data modification(s) on the first data set, transmission of a notification event message relating to the ongoing transaction to a data consistency controller. The method includes receiving, by the data repository, a notification event response message relating to the ongoing transaction from the data consistency controller, the notification event response message indicating to the data repository whether (i) to commit the data modification(s) instructed by the commit order on the first data set and corresponding data modification(s) on the second data set, or (ii) to roll back the data modification(s) instructed by the commit order on the first data set.

16 Claims, 8 Drawing Sheets

(52) U.S. Cl.
CPC ...... *G06F 11/1469* (2013.01); *G06F 11/1474* (2013.01); *G06F 17/30371* (2013.01); *G06F 17/30377* (2013.01); *G06F 2201/80* (2013.01); *G06F 2201/82* (2013.01)

(58) Field of Classification Search
CPC ......... G06F 17/30371; G06F 17/30377; G06F 2201/80; G06F 2201/82; G06F 17/30088; G06F 11/1471
See application file for complete search history.

(56) References Cited

U.S. PATENT DOCUMENTS

| | | | | |
|---|---|---|---|---|
| 2005/0091187 | A1* | 4/2005 | Madhavarapu | ... G06F 17/30227 |
| 2008/0168072 | A1* | 7/2008 | Freedman | ......... G06F 17/30581 |
| 2009/0313311 | A1* | 12/2009 | Hoffmann | ........... G06F 11/2094 |
| 2010/0191884 | A1* | 7/2010 | Holenstein | .......... G06F 11/2094 710/200 |
| 2013/0006993 | A1 | 1/2013 | Kobayashi | |
| 2014/0258234 | A1* | 9/2014 | Michels | ............ G06F 17/30309 707/638 |
| 2016/0335337 | A1* | 11/2016 | Alonso Alarcon | ........................... G06F 17/30575 |
| 2016/0350392 | A1* | 12/2016 | Rice | .................. G06F 17/30575 |

OTHER PUBLICATIONS

3GPP, Technical Specification—"3rd Generation Partnership Project; Technical Specification Group Services and System Aspects; Service aspects; Service principles (Release 12)", 3GPP TS 22.101 V12.4.0 (Mar. 2013), 68 pp.
3GPP, Technical Specification—"3rd Generation Partnership Project; Technical Specification Group Services and System Aspects; IP Multimedia Subsystem (IMS) centralized services; Stage 2 (Release 12)", 3GPP TS 23.292 V12.2.0 (Jun. 2013), 120 pp.
3GPP, Technical Specification—"3rd Generation Partnership Project; Technical Specification Group Core Network and Terminals; Mobile radio interface layer 3; Supplementary services specification; General aspects (Release 11)", 3GPP TS 24.010 V11.0.0 (Sep. 2012), 31 pp.
GSM Association, Official Document IR.64—"IMS Service Centralization and Continuity Guidelines", Version 6.0, Feb. 28, 2013, 18 pp.
GSM Association, Official Document IR.92— "IMS Profile for Voice and SMS", Version 7.0, Mar. 3, 2013, 32 pp.
International Search Report and the Written Opinion of the International Searching Authority corresponding to International Application No. PCT/EP2013/077905 (11 pages) (dated Oct. 9, 2014).
Samaras et al. "Two-Phase Commit Optimizations in a Commercial Distributed Environment" *Distributed and Parallel Databases* 3(4):352-360 (Oct. 1995).
Zeilenga et al. "Lightweight Directory Access Protocol (LDAP) Transactions" RFC 5805, Mar. 2010, 11 pp.
Christ Clifton: "CS54100: Database Systems", Jan. 27, 2012 (Jan. 27, 2012), pp. 1-14, XP055466353, Purdue University. Retrieved from the Internet: URL: http://citeseerx.ist.
European Patent Office Communication pursuant to Article 94(3) EPC; dated Apr. 18, 2018; pp. 1-2.
European Patent Office—Annex to Communication to Article 94(3) EPC; dated Apr. 18, 2018; pp. 1-8.

* cited by examiner

DATA CHANGE CONTROLLER

CROSS REFERENCE TO RELATED APPLICATION

This application is a 35 U.S.C. § 371 national stage application of PCT International Application No. PCT/EP2013/077905, filed on Dec. 23, 2013, the disclosure and content of which is incorporated by reference herein in its entirety. The above-referenced PCT International Application was published in the English language as International Publication No. WO 2015/096849 A1 on Jul. 2, 2015.

TECHNICAL FIELD

The present disclosure generally relates to the field of data synchronisation. More specifically, the present disclosure relates to a technique of synchronising first and second data sets stored in a data repository as well as to techniques of supporting and controlling the synchronisation of the first and second data sets.

BACKGROUND

In computer science, ACID (Atomicity, Consistency, Isolation, Durability) is a set of properties that guarantee that transactions are processed reliably. Generally, a transaction can be regarded as a logical unit of work that may include any number of data changes such as file or database updates. In the context of databases, a single logical operation on the data is normally called a transaction. A transaction may involve one or more operation steps. For example, a transfer of funds from one bank account to another, even involving multiple changes such as debiting one account (first operation step) and crediting another (second operation step), is a single transaction.

Atomicity requires that each transaction is "all or nothing": if one part (one or more operation steps) of the transaction fails, the entire transaction fails, and the database state is left unchanged. That is, in an atomic transaction, a series of database operations either all occur, or nothing occurs. To the outside world, a committed transaction appears (by its effects on the database) to be indivisible ("atomic"), and an aborted transaction does not happen (it is "rolled back"). In other words, atomicity means indivisibility and irreducibility. The terms "commit" and "rollback" (or "roll back") will be described below in more detail.

The consistency property ensures that any transaction will bring the database from one valid state to another. Any data written to the database must be valid according to all defined rules, including but not limited to constraints, cascades, triggers, and any combination thereof. In database systems, a consistent transaction is one that does not violate any integrity constraints during its execution. If a transaction would leave the database in an illegal state, it is aborted and an error is reported. Consistency ensures that any changes to values in an instance are consistent with changes to other values in the same instance.

The isolation property ensures that the concurrent execution of transactions results in a system state that would be obtained if transactions were executed serially, i.e. one after the other. Durability means that once a transaction has been committed, it will remain so, even in the event of power loss, crashes, or errors. In a relational database, for instance, once a group of SQL statements execute, the results need to be stored permanently (even if the database crashes immediately thereafter).

In computer science and data management, a commit is the making of a set of tentative changes permanent. A popular usage is at the end of a transaction. A commit is an act of committing. A COMMIT statement in SQL ends a transaction within a relational database management system (RDBMS) and makes all changes visible to other users. In SQL, the general format of a transaction is to issue a BEGIN WORK statement, one or more SQL statements, and then the COMMIT statement. A COMMIT statement will also release any existing savepoints that may be in use.

In terms of transactions, the opposite of commit is to discard the tentative changes of a transaction, a rollback. In database technologies, a rollback is an operation which returns the database to some previous state. Rollbacks are important for database integrity, because they mean that the database can be restored to a clean copy even after erroneous operations are performed. By rolling back any transaction which was active at the time of a database crash, the database is restored to a consistent state. In SQL, ROLLBACK is a command that causes all data changes since the last BEGIN WORK, or START TRANSACTION to be discarded by the RDBMS, so that the state of the data is "rolled back" to the way it was before those changes were made. That is, if a ROLLBACK statement is issued, all the work performed since BEGIN WORK was issued are undone.

An example to illustrate the roles of the commit and roll back is a money transfer between two checking accounts. In certain scenarios commit is called atomic commit in order to underline that the atomic commit is an operation in which a set of distinct changes is applied as a single operation. To start, first, 100 dollars are removed from account X. Second, 100 dollars are added to account Y. If the entire operation is not completed as one atomic commit, then several problems could occur. If the system fails in the middle of the operation, after removing the money from X and before adding into Y, then 100 dollars have just disappeared. Another issue is if the balance of Y is checked before the 100 dollars are added. In the latter case, the wrong balance for Y will be reported. Because of the commit order neither of these cases can happen: in the first case of the system failure, the atomic commit would be rolled back and the money returned to X. In the second case, the request of the balance of Y cannot occur until the atomic commit is fully completed. That is, atomic commits in database systems fulfil two of the key properties of ACID, atomicity and consistency. Consistency is only achieved if each change in the atomic commit is consistent. If the system crashes or shuts down when one operation has completed but the other has not, and there is nothing in place to correct this, the system can be said to lack (transaction) consistency. With a money transfer, it is desirable that either the entire transaction completes, or none of it completes. Both of these scenarios keep the balance in check.

Guaranteeing ACID properties in a distributed transaction across a distributed database where no single node is responsible for all data affecting a transaction presents additional complications. A distributed database is a database in which storage devices are not all attached to a common processing unit such as a Central Processing Unit (CPU), controlled by a distributed database management system (together sometimes called a distributed database system). It may be stored in multiple computers, located in the same physical location or may be dispersed over a network of interconnected computers. Unlike parallel systems, in which the processors are tightly coupled and constitute a single database system, a distributed database system comprises loosely-coupled sites that share no physical components.

The two-phase commit protocol (2PC) may be regarded as a type of atomic commitment protocol (ACP) which guarantees ACID properties, as it provides atomicity for distributed transactions to ensure that each participant in the transaction agrees on whether the transaction should be committed or not. Briefly, in the first phase, one node (the coordinator) interrogates the other nodes (the participants) and only when all reply that they are prepared, the coordinator, in the second phase, formalizes (completes) the transaction. If any participant (cohort) replies that it is not prepared, the coordinator sends a rollback message to all the participants.

One disadvantage of the two-phase commit protocol is that it is a blocking protocol. If the coordinator fails permanently, some cohorts will never resolve their transactions: After a cohort has sent an agreement message to the coordinator, it will block until a commit or rollback is received.

SUMMARY

There is a need for simple but effective techniques for supporting, controlling and performing data synchronisation.

According to a first aspect, a method of synchronising first and second data sets stored in a data repository is provided. The method according to the first aspect comprises the steps of: (a) triggering, by the data repository, in response to a commit order relating to an ongoing transaction requested by a client and instructing the data repository to apply one or more data modifications on the first data set, transmission of a notification event message relating to the ongoing transaction to a data consistency controller; (b) receiving, by the data consistency controller, the notification event message triggered by the data repository; (c) transmitting, by the data consistency controller, a notification event response message relating to the transaction to the data repository, the notification event response message indicating to the data repository whether (i) to commit the one or more data modifications instructed by the commit order on the first data set and one or more corresponding data modifications on the second data set, or (ii) to roll back the one or more data modifications instructed by the commit order on the first data set; and (d) receiving, by the data repository, the notification event response message relating to the ongoing transaction from the data consistency controller.

After or upon receipt of the notification event response message, the data repository may either (i) commit the one or more data modifications instructed by the commit order on the first data set and one or more corresponding data modifications on the second data set, or (ii) roll back the one or more data modifications instructed by the commit order on the first data set. Either way, the first and second data sets will be or will stay synchronised with each other, as either (i) on both data sets corresponding data modifications (data changes) are committed or (ii) the data modification already carried out on the first data set are rolled back while no data modifications have been carried out on the second data set.

The transaction may be considered to be started by the client (e.g., by requesting the one or more data modifications to be carried out on the first data set). Further, the transaction may be considered to be ended by the data repository by (i) committing the one or more data modifications instructed by the commit order on the first data set and the one or more corresponding data modifications on the second data set or (ii) rolling back the one or more data modifications instructed by the commit order on the first data set.

According to a second aspect, a method of supporting synchronisation of first and second data sets stored in a data repository is provided. The method according to the second aspect comprises the steps of: (a) triggering, by the data repository, in response to a commit order relating to an ongoing transaction requested by a client and instructing the data repository to apply one or more data modifications on the first data set, transmission of a notification event message relating to the ongoing transaction to a data consistency controller; and (b) receiving, by the data repository, a notification event response message relating to the ongoing transaction from the data consistency controller. The notification event response message indicates to the data repository whether (i) to commit the one or more data modifications instructed by the commit order on the first data set and one or more corresponding data modifications on the second data set, or (ii) to roll back the one or more data modifications instructed by the commit order on the first data set.

The method according to the second aspect may be regarded as a subset of the method according to the first aspect, namely as a subset containing the method steps of the method according to the first aspect, which are carried out by the data repository.

The term "relating to" as used herein in connection with the "ongoing transaction" may be understood as indicating any possible relation with the ongoing transaction. For example, in this context, the term "relating to" may, in special scenarios, be understood as "belong to". That is, the wording "relating to an ongoing transaction" may in some scenarios be understood as "belonging to an ongoing transaction". Further, the term "corresponding" in connection with "data modifications" may be understood as an indication that the data modifications carried out on the second data set comply with the data modifications carried out on the first data set, without being necessarily the same. Thus, according to one example, the term "corresponding data modifications" may mean that the same data modifications are carried out on the first and second data sets. However, according to other examples, the corresponding data modifications on the first and second data sets may comprise or be relating to the same change in content, but necessitate different modification steps. In the latter case, the term "corresponding data modifications" may be understood as "equivalent data modifications".

The terms commit and roll back (or rollback) may be understood in the way known in computer science and as explained in the "background" section above. In other words, the term commit may be understood to mean that the one or more data modifications (or data changes) on the first data set and the one or more corresponding data modifications (or data changes) on the second data set are made permanent. Likewise, the term roll back (or rollback) may be understood as an operation which returns the first data set to a previous state, e.g., to the state before the one or more data modifications instructed by the commit order have been performed or carried on the first data set.

Depending on the indication by the notification event response message, the one or more data modifications instructed by the commit order on the first data set and the one or more corresponding data modifications on the second data set may be committed by the data repository, or the one or more data modifications instructed by the commit order on the first data set may be rolled back by the data repository. In other words, if, for example, the notification event response message indicates that the one or more data modifications are to be continued, the data repository may commit the one or more data modifications instructed by the commit order on the first data set and the one or more corresponding data modifications on the second data set. In this case, the first and second data sets will be or will stay synchronised with each other, as corresponding data modifications (data changes) are committed on both data sets. Alternatively, if, for example, the notification event response message indicates that the one or more data modifications shall be rejected, the data repository may roll back the one or more data modifications instructed by the commit order on the first data set. In the latter case, as the one or more corresponding data modifications on the second data set have not yet been performed, there is no need for the data repository to roll back these one or more corresponding data modifications. In consequence, as the data modification already carried out on the first data set are rolled back while no data modifications have been carried out on the second data set, the first and second data sets will be or will stay synchronised with each other.

The method according to the first aspect and/or the method according to the second aspect may further comprise the step of receiving, by the data repository, one or more request messages relating to the ongoing transaction, e.g., belonging to the ongoing transaction, from the data consistency controller. The one or more request messages may request the data repository to apply one or more additional data modifications on the first data set and one or more corresponding additional data modifications on the second data set. In this way, the data consistency controller is able to request some additional data changes in addition to the one or more data modifications requested by the client. The one or more additional data modifications may be signalled by means of one single request message or via multiple request messages, wherein each of the multiple request messages indicates one or more additional data modifications.

For example, all data modifications relating to the ongoing transaction may be committed by the data repository on the first data set. These all data modifications may include the one or more data modifications instructed by the commit order and the one or more additional data modifications requested by the data consistency controller. In addition, all corresponding data modifications may be committed by the data repository on the second data set. These all corresponding data modifications may include the one or more corresponding data modifications (which correspond to the one or more data modifications instructed by the commit order) and the one or more corresponding additional data modifications (which correspond to the one or more additional data modifications requested by the data consistency controller).

The step of triggering the transmission of the notification event message may be performed only if the commit order instructs the data repository to apply the one or more data modifications on specific data of the first data set. In this way, it is possible to trigger the data modifications in a targeted manner. For example, the triggering step may be carried out if the commit order instructs the data repository to apply the one or more data modifications on a specific type of data contained in the first data set, but is not carried out if the commit order instructs the data repository to apply the one or more data modifications on another specific type of data contained in the first data set. It may be flexibly adjusted which data modifications trigger the transmission of the notification event message and which do not trigger the transmission of the notification event message.

The method according to the first aspect and/or the method according to the second aspect may further comprise the step of including, by the data repository, a transaction identifier identifying the ongoing transaction into the notification event message. In this way, the ongoing transaction may be uniquely identified. In consequence it may be easily possible to distinguish the ongoing transaction from other transactions which may be identified by different transaction identifiers.

The method according to the first aspect and/or the method according to the second aspect may further comprise the step of reporting, by the data repository, a report message to the client. The report message may indicate to the client whether the one or more data modifications on the first data set as instructed by the commit order were committed or rolled back. If it is indicated to the client that the one or more data modifications on the first data set were rolled back, the client may request the same one or more data modifications again or different data modifications.

According to a third aspect, a method of controlling synchronisation of first and second data sets stored in a data repository is provided. The method comprises the steps of: (a) receiving, by a data consistency controller, a notification event message triggered by the data repository in response to a commit order relating to an ongoing transaction requested by a client and instructing the data repository to apply one or more data modifications on the first data set; and (b) transmitting, by the data consistency controller, a notification event response message relating to the ongoing transaction to the data repository. The notification event response message indicates to the data repository whether (i) to commit the one or more data modifications instructed by the commit order on the first data set and one or more corresponding data modifications on the second data set, or (ii) to roll back the one or more data modifications instructed by the commit order on the first data set.

The method according to the third aspect may be regarded as a subset of the method according to the first aspect, namely as a subset containing the method steps of the method according to the first aspect, which are carried out by the data consistency controller.

In accordance with the method according to the first aspect and/or the method according to the third aspect, the method may further comprise the step of transmitting, by the data consistency controller, one or more request messages relating to the ongoing transaction to the data repository. The one or more request messages request the data repository to apply one or more additional data modifications on the first data set and one or more corresponding additional data modifications on the second data set. In this way, the data consistency controller is able to request additional data changes.

As can be seen from the method steps of the methods according to the first, second and third aspects, the notification event message is transmitted from the data repository to the data consistency controller and the notification event response message is transmitted from the data consistency controller to the data repository before any data modifications relating to the ongoing transaction are committed or rolled back. This supports to maintain synchronisation between the first and second data sets.

In accordance with all method aspects described herein, the notification event message and the notification event response message may be based on Simple Object Access Protocol (SOAP). Alternatively or additionally, the ongoing transaction may be a Lightweight Directory Access Protocol (LDAP) transaction.

In accordance with all method aspects described herein, the first data set may comprise data for circuit switched (CS) services. Alternatively or additionally, the second data set may comprise data for IP Multimedia Subsystem (IMS) services.

In accordance with all method aspects described herein, the first and second data sets may be distributed data sets and the data repository may be a distributed data repository. In this case, the data consistency controller may be referred to as a Distributed Data Consistency Controller (DDCC).

According to a fourth aspect, a computer program is provided, the computer program comprising program code portions for performing the steps of any one of the method aspects described herein, when the computer program is run on one or more computing devices. The computer program may be stored on a computer readable recording medium.

According to a fifth aspect, a data repository for supporting synchronisation of first and second data sets stored in the data repository is provided. The data repository comprises: (a) a triggering component configured to trigger, in response to a commit order relating to an ongoing transaction requested by a client and instructing the data repository to apply one or more data modifications on the first data set, transmission of a notification event message relating to the ongoing transaction to a data consistency controller; and (b) a receiving component configured to receive a notification event response message relating to the ongoing transaction from the data consistency controller. The notification event response message indicates to the data repository whether (i) to commit the one or more data modifications instructed by the commit order on the first data set and one or more corresponding data modifications on the second data set, or (ii) to roll back the one or more data modifications instructed by the commit order on the first data set.

The data repository may be configured to perform any one of the method aspects as described herein with reference to the method according to the second aspect. For this purpose, the data repository may comprise suitable components or devices for performing said method aspects.

The data repository may be configured as a distributed data repository. For example, the data repository may be configured as a User Data Repository (UDR) in a User Data Convergence (UDC) environment.

According to a sixth aspect, a data consistency controller for controlling synchronisation of first and second data sets stored in a data repository is provided. The data consistency controller comprises: (a) a receiving component configured to receive a notification event message triggered by the data repository in response to a commit order relating to an ongoing transaction requested by a client and instructing the data repository to apply one or more data modifications on the first data set; and (b) a transmitting component configured to transmit a notification event response message relating to the ongoing transaction to the data repository. The notification event response message indicates to the data repository whether (i) to commit the one or more data modifications instructed by the commit order on the first data set and one or more corresponding data modifications on the second data set, or (ii) to roll back the one or more data modifications instructed by the commit order on the first data set.

The data consistency controller may be configured to perform any one of the method aspects as described herein with reference to the method according to the third aspect. For this purpose, the data consistency controller may comprise suitable components or devices for performing said method aspects.

The data consistency controller may be configured as a Distributed Data Consistency Controller (DDCC).

According to a seventh aspect, a system for synchronising first and second data sets stored in a data repository according to the fifth aspect is provided. The system comprises: (a) at least one data repository according to the fifth aspect as described herein; and (b) the data consistency controller according to the sixth aspect as described herein.

The system may be configured to perform any one of the method aspects as described herein with reference to the method according to the first aspect. For this purpose, the system, for example, the data repository and/or the data consistency controller of the system, may comprise suitable components or devices for performing said method aspects.

In general, any of the method aspects described herein may equally be embodied in one or more suitable components, devices or units.

BRIEF DESCRIPTION OF THE DRAWINGS

In the following, the present disclosure will further be described with reference to exemplary embodiments illustrated in the figures, in which.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, the skilled person will appreciate that the present disclosure may be practiced in concepts and mechanisms different from the specific UDC based concept discussed below to illustrate the present disclosure. Also, the present disclosure may be practiced in any network to which mobile or stationary users may attach. For example, the present disclosure is applicable to cellular networks such as Global System for Mobile Communications (GSM), Universal Mobile Telecommunications System (UMTS), Long Term Evolution (LTE), LTE-advanced (LTE-a) networks, or to Wireless Local Area Network (WLAN) or similar wireless networks, but also to wireline networks such as, for example, the Intranet of a company with some or many separated subsidiaries or the Internet.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to perform the methods disclosed herein when executed by the processor.

Figure 1:
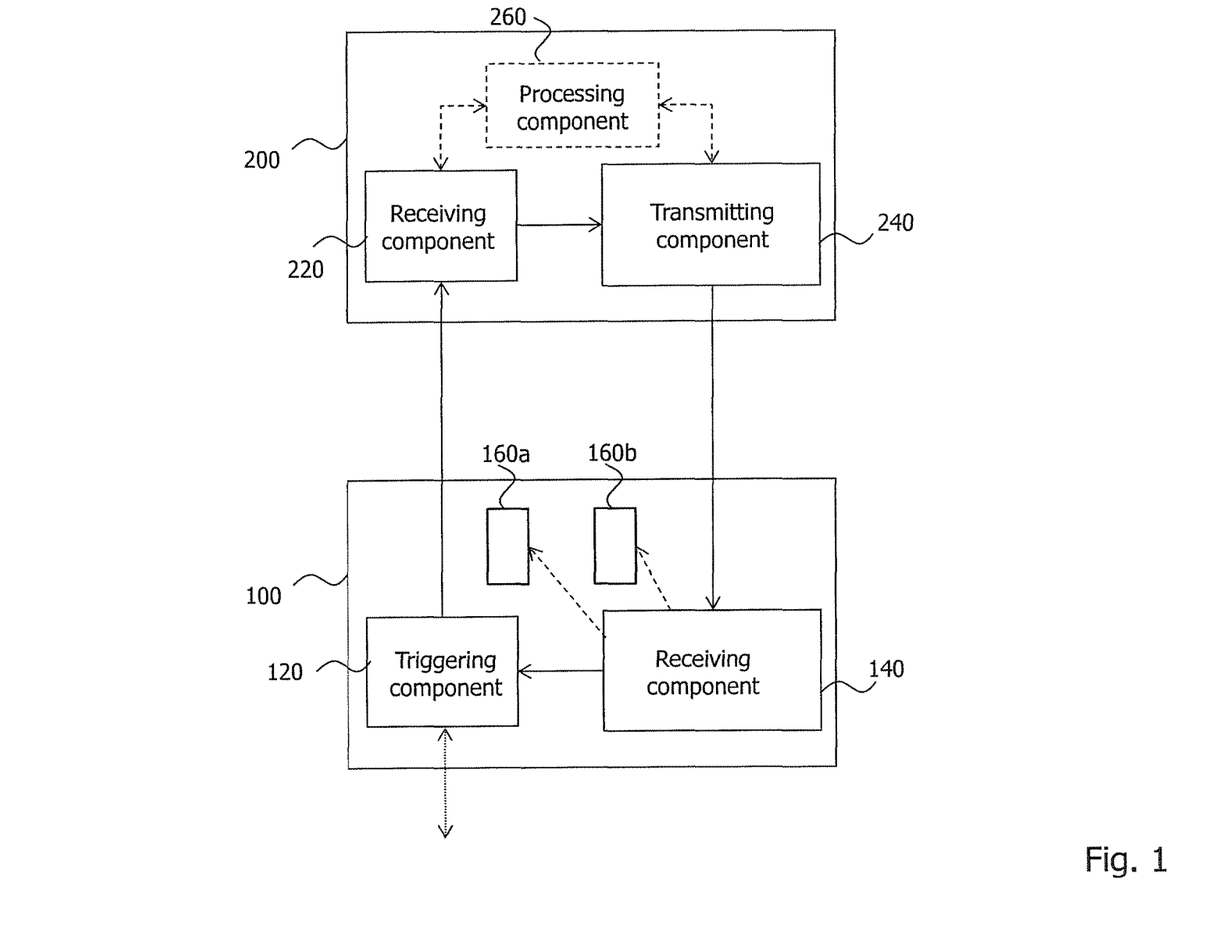
FIG. 1 is a schematic illustration of a data repository according to a device embodiment and a data consistency controller according to a device embodiment.

FIG. 1 is a schematic illustration of a data repository 100 according to a device embodiment and a data consistency controller 200 according to a device embodiment The data repository 100 comprises a triggering component 120 and a receiving component 140. As can be schematically seen from FIG. 1, a first data set 160a and a second data set 160b are stored in the data repository 100. The first 160a and second data sets 160b may be stored together in one single memory of the data repository 100. It is equally conceivable that the first 160a and second data sets 160b are distributed over different locations as distributed data sets. As schematically illustrated by the dashed arrows in FIG. 1, the receiving component is adapted to carry out data changes on the first and second data sets 160a, 160b, respectively, as will be explained in more detail below. For this purpose, the receiving component may comprise a suitable processing component (not shown).

Figure 2:
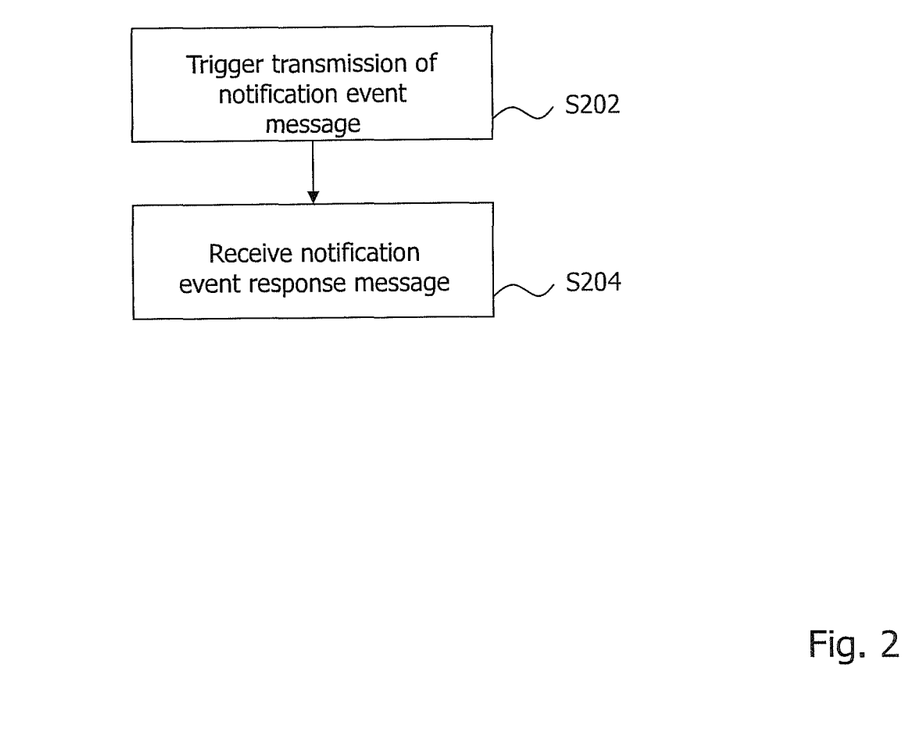
FIG. 2 is a flowchart illustrating a method embodiment performed in the data repository of FIG. 1.

The data repository 100 is configured to support synchronisation of the first 160a and second data sets 160b as described hereinbelow with respect to FIG. 2.

The data consistency controller 200 comprises a receiving component 220 and a transmitting component 240. Further, the data consistency controller 200 may comprise a processing component 260. The receiving component 220 and the transmitting component 240 may both be configured to bidirectionally communicate with the processing component 260. The data consistency controller 200 is configured to control synchronisation of the first 160a and second data sets 160b stored in the data repository 100 as described hereinbelow with respect to FIG. 3.

A method embodiment carried out in the data repository 100 will be described with reference to FIG. 2.

In step S202, the triggering component 120 of the data repository 100 triggers transmission of a notification event message relating to an ongoing transaction to the data consistency controller 200, more precisely to the receiving component 220 of the data consistency controller 200. The triggering is performed or initiated in response to a commit order relating to the ongoing transaction requested by a client and instructing the data repository 100 to apply one or more data modifications on the first data set 160a. In other words, the triggering component 120 may receive a commit order from a client. The commit order may relate to an ongoing transaction requested or initiated by the client (not shown) via its, for example, bidirectional interface, as illustrated by the dotted arrow. For example, the commit order may be the starting point of the ongoing transaction. The commit order instructs the data repository 100 to apply one or more data modifications on the first data set 160a. In response to the commit order, the data repository 100 does not commit the data modifications. Rather, the data repository 100 carries out the data modifications on the first data set 160a without committing them and transmits the notification event message relating to the same ongoing transaction to the data consistency controller 200.

Then, in step S204, the receiving component 140 of the data repository 100 receives a notification event response message relating to the ongoing transaction from the data consistency controller 200, more precisely from the transmitting component 240 of the data consistency controller 200. The notification event response message indicates to the data repository 100 whether to commit the one or more data modifications instructed by the commit order on the first data set 160a and one or more corresponding data modifications on the second data set 160b, or to roll back the one or more data modifications instructed by the commit order on the first data set 160a.

If the notification event response message indicates to commit, the data repository 100 commits the one or more data modifications as instructed by the commit order on the first data set 160a and the one or more corresponding data modifications on the second data set 160b. As corresponding data modifications have then been performed and committed on both data sets 160a, 160b, the first 160a and second data sets 160b remain synchronised with each other. Likewise, if the notification event response message indicates to roll back, the one or more data modifications as instructed by the commit order are rolled back on the first data set 160a. As no data modifications have then been performed on the second data set 160b and no data modifications have been committed on the first set 160a (the data modifications have been carried out, but not committed), the data sets 160a, 160b remain synchronised with each other.

Figure 3:
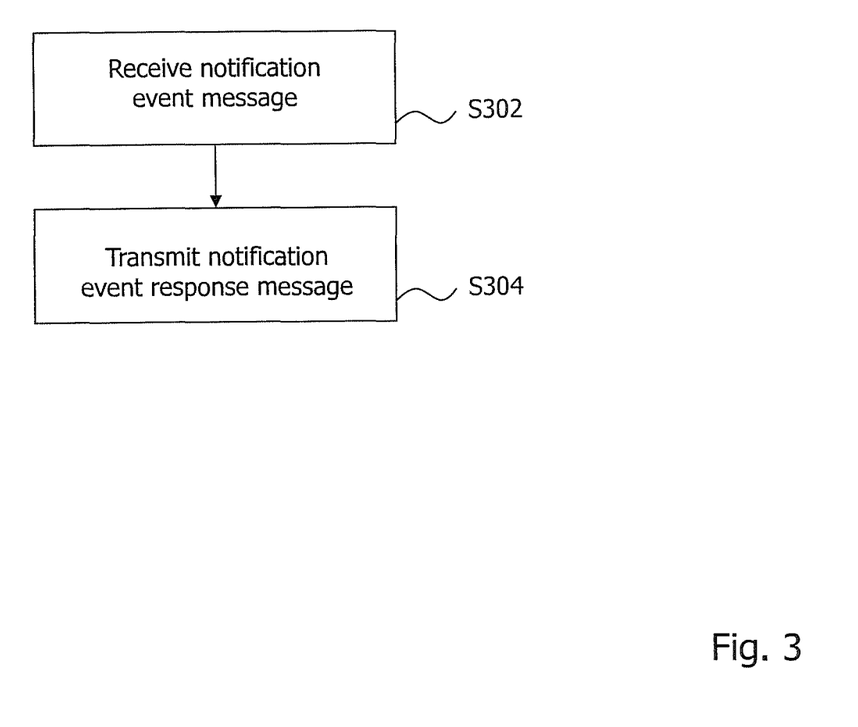
FIG. 3 is a flowchart illustrating a method embodiment performed in the data consistency controller of FIG. 1.

A method embodiment carried out in the data consistency controller 200 will be described with reference to FIG. 3.

In step S302, the receiving component 220 of the data consistency controller 200 receives a notification event message triggered by the data repository 100, more precisely triggered by the triggering component 120 of the data repository 100. As described above, the notification event message is triggered in response to a commit order relating to an ongoing transaction requested by a client and instructing the data repository 100 to apply one or more data modifications on the first data set 160a. After having received the notification event message or upon receipt of the notification event message, the transmitting component 240 of the data consistency controller 200 transmits a notification event response message relating to the ongoing transaction to the data repository 100, more precisely the receiving component 140 of the data repository 100 (step S304). The notification event response message indicates to the data repository 100 whether to commit the one or more data modifications instructed by the commit order on the first data set 160a and one or more corresponding data modifications on the second data set 160b, or to roll back the one or more data modifications instructed by the commit order on the first data set 160a.

If the notification event response message indicates to commit, the data repository 100 commits the one or more data modifications as instructed by the commit order on the first data set 160a and one or more corresponding data modifications on the second data set 160b. As corresponding data modifications have been performed and committed on both data sets 160a, 160b, the first 160a and second data sets 160b remain synchronised with each other. Likewise, if the notification event response message indicates to roll back, the one or more data modifications as instructed by the commit order are rolled back on the first data set 160a. As no data modifications have been performed on the second data set 160b and no data modifications have been committed on the first set 160a (the data modifications have been carried out, but not committed), the data sets 160a, 160b remain synchronised with each other.

The data consistency controller 200 may be configured to request additional data modifications. If the data consistency controller determines or decides to request additional data modifications, the processing component 260, for instance, may configure one or more request messages relating to the ongoing transaction, e.g., belonging to the ongoing transaction, and may instruct the transmitting component 240 to transmit the one or more request messages to the data repository 100. The one or more request messages may request the data repository to apply one or more additional data modifications on the first data set 160a and one or more corresponding additional data modifications on the second data set 160b. In this way, the data consistency controller 200 is able to request additional data changes in addition to the one or more data modifications requested by the client. The one or more additional data modifications may be signalled by means of one single request message or via multiple request messages, wherein each of the multiple request messages indicates one or more additional data modifications.

In the following, the present disclosure will be described in more detail with respect to a specific User Data Convergence (UDC) architecture and concept. In order to understand the specific details set out below, some general information is provided first.

Figure 4:
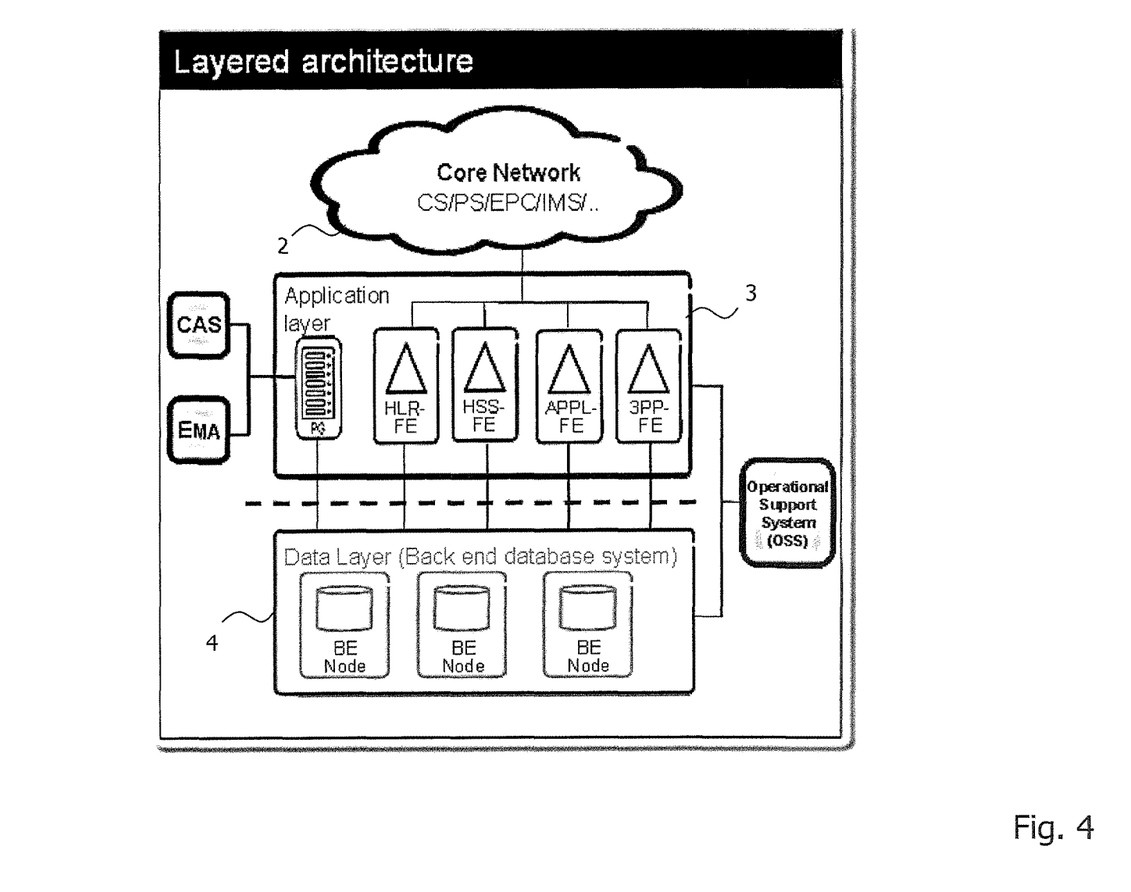
FIG. 4 is a general overview over the Data Layered Architecture (DLA)

The so-called 3GPP Data Layered Architecture (DLA) is briefly explained with respect to FIG. 4. DLA is a 3GPP defined architecture that splits the traditional node and network architecture as introduced in e.g. GSM/UMTS and the Internet Protocol (IP) Multimedia Subsystem (IMS), in two halves, namely an Application layer 3 containing one or more Application-FrontEnds (Application-FEs) and a Data layer 4 containing one or more Data-BackEnds (Data-BEs). The one or more Data-BEs provide a highly available and geo-redundant solution to the one or more Application-FEs that simplifies the design of applications. DLA also simplifies the routing in the Core Networks (illustrated by Core Network (CN) 2 in FIG. 4) since any node can, if it is built as a stateless FE, serve any subscriber.

For example, each of the Application-FEs of the Application layer 3 can use the date stored in the Data-BEs of the Data layer 4.

With DLA, any application-FE can serve any subscriber and the network routing becomes very simple. The Data-BE solves the routing for the applications. In the classic architecture (without DLA), the Core Network needs to keep track of the HLR that serves a particular subscriber. Other advantages of DLA include Data and Repository Consolidation allowing databases and data-object sharing, and simplified provisioning (and removal) of subscribers to the system. In summary, in DLA, any application can serve any subscriber. Further, several applications (application FEs) can use the same Data-BE. In consequence, Data duplication is reduced (Data de-duplication) by allowing several applications to access the same object. Still further, the Data-BE provides high data availability and subscribers can be dynamically allocated to Application-FEs.

Figure 5:
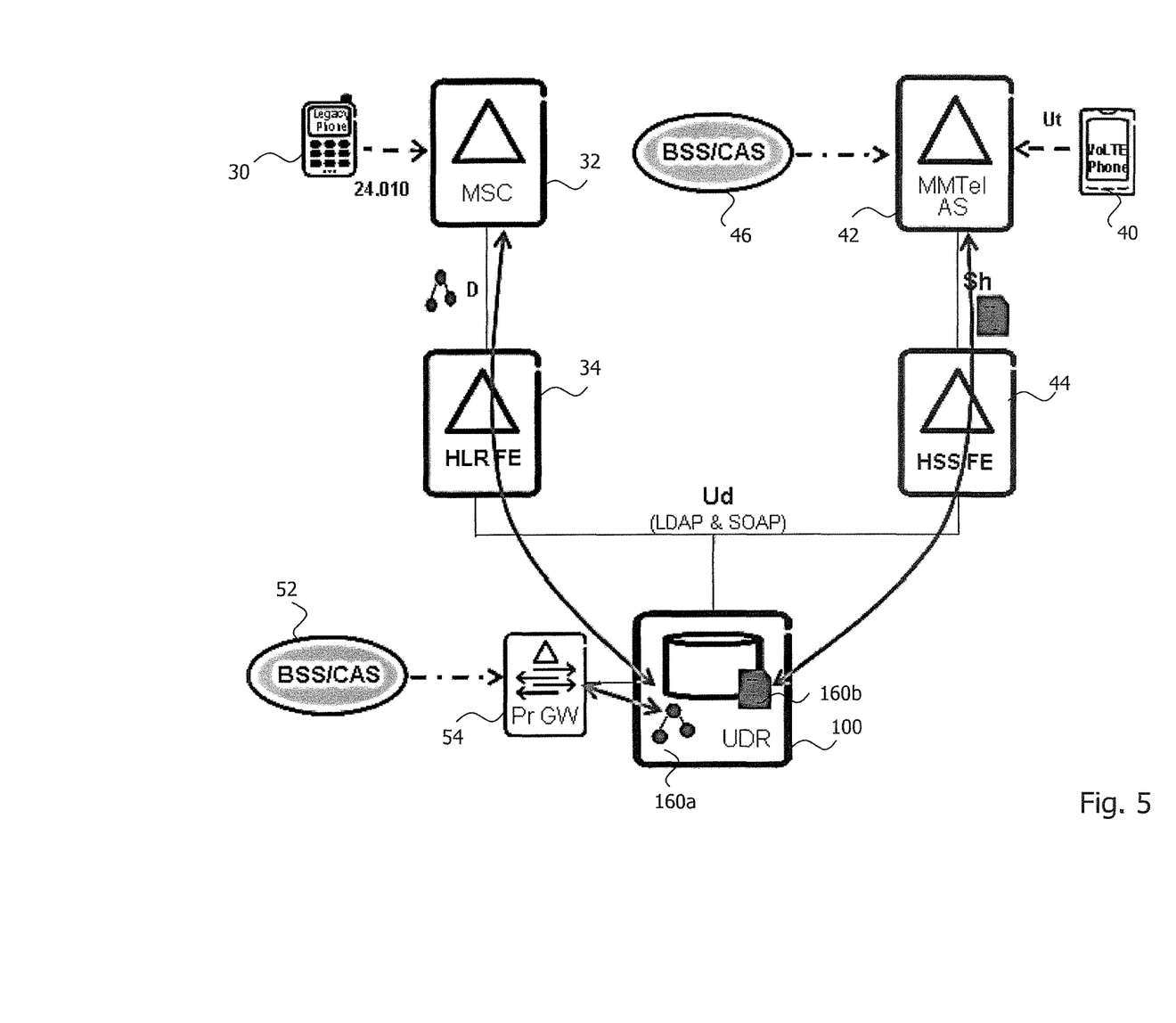
FIG. 5 is a schematic illustration of the User Data Convergence (UDC) concept.

The 3GPP User Data Convergence (UDC) (also sometimes referred to as User Data Consolidation) concept supports DLA and is described in 3GPP TS 22.101. Like DLA in general, UDC simplifies the overall network topology and interfaces and avoids data duplication and inconsistency. UDC simplifies creation of new services and facilitates service development and deployment through a common set of user data. UDC promotes service and network convergence to support the increasing number of services including Internet services and User Equipment (UE) applications. One example which is based on UDC is shown in FIG. 5. A so-called User Data Repository (UDR) 100 is considered for UDC. The UDR 100 of FIGS. 5 to 8 can be regarded as a specific type of the data repository 100 of FIG. 1. In UDC, all the user data is stored in a single UDR (the UDR 100) allowing access from core and service network entities. To achieve high performance, reliability, security and scalability, the UDR 100 entity may comprise a network of different components distributed geographically, and exposes capabilities via open interfaces in multiple access entry points. In this respect, the UDR 100 is some kind of distributed storage such as a distributed database.

In the current 3GPP system, user data are scattered in several domains and different network entities. Examples of such domains are Circuit Switched (CS) domain, Packet Switched (PS) domain, and IMS domain. Examples of such different network entities are Home Location Register (HLR), Home Subscriber Server (HSS), and Application Servers. As UDC implements DLA, these different network entities are implemented as Application-FEs, e.g., as HLR-FE 34 and HSS-FE 44. The data to be accessed by the Application-FEs such as the HLR-FE 34 and the HSS-FE 44 are stored in the UDR 100. With the increase of user data entities and the resulting data types, it is more difficult for integrated services to access necessary user information from plural entities. With UDC, different applications can access and use data stored in the same UDR 100.

Figure 6:
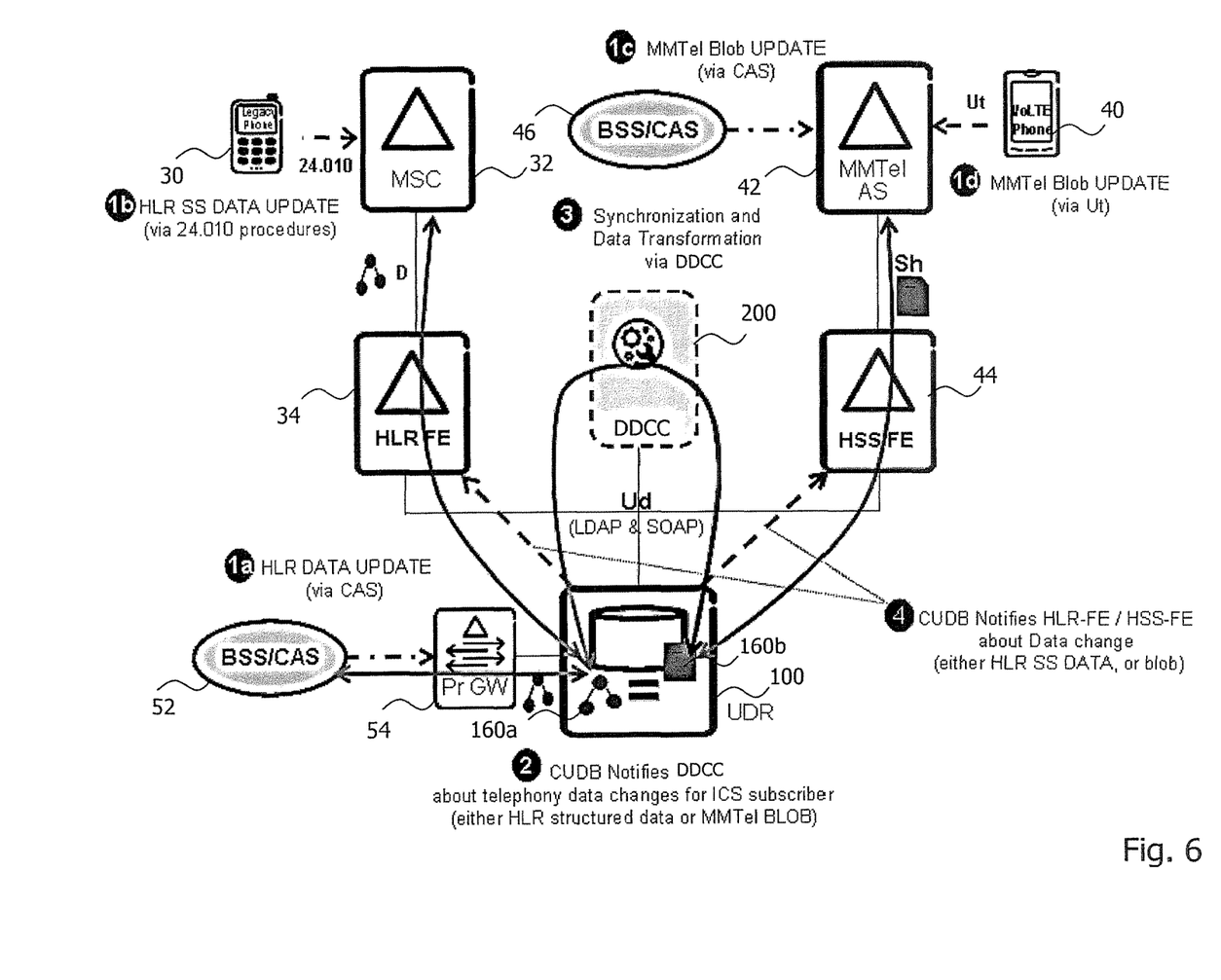
FIGS. 6 and 7 show a schematic illustration of data synchronization performed in the UDC concept environment of FIG. 6.
Figure 7:
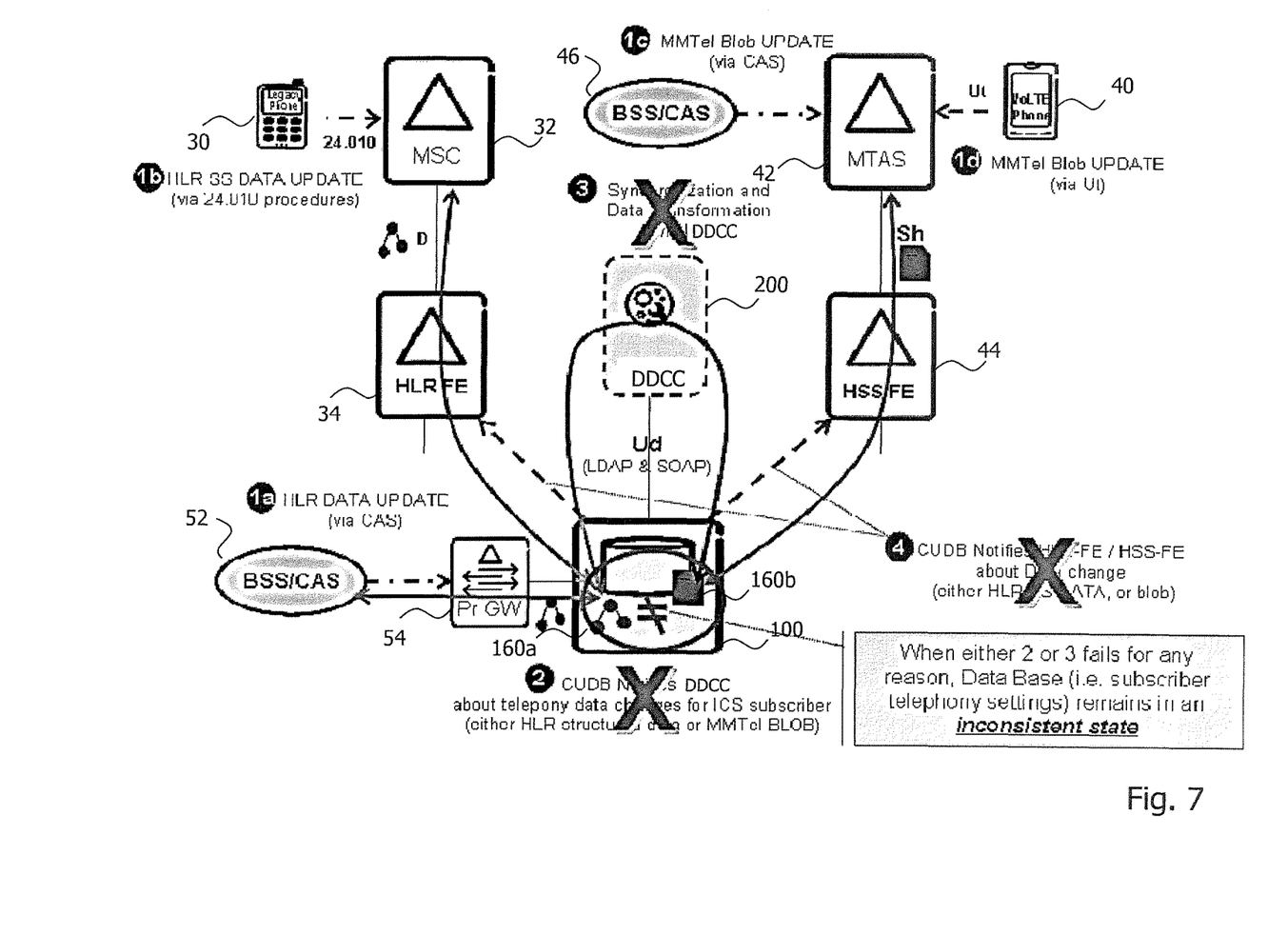

In order to illustrate that several domains (e.g. CS, PS, IMS) and different network entities (e.g. HLR, HSS, Application Servers) access data stored in the same UDR 100 and possible difficulties resulting therefrom, FIGS. 5 to 7 are provided. FIGS. 5 to 7 schematically illustrate how clients from different domains are accessing the same UDR 100. That is, a legacy User Equipment (UE) 30 (also referred to as 2G/3G UE 30) and a Voice over Long Term Evolution (LTE) UE (VoLTE UE) 40 are shown which are respectively accessing 2G/3G HLR data as an example of a first data set 160a and VoLTE data as an example of a second data set 160b.

The legacy UE 30 is connected to a mobile switching center (MSC) 32 as the primary service delivery node for GSM/UMTS (2G/3G). The MSC 32 is responsible for routing voice calls and short messages as well as other services (such as conference calls and CS data). The legacy UE 30 can access the HLR-FE 34 and the associated data 160a contained in the UDR 100. The VoLTE UE 40 is connected to multimedia telephony service (MMTeI) Application Server (AS) 42 as the primary service delivery node for VoLTE service. The VoLTE UE 40 can access the HSS-FE 44 and the associated data 160b contained in the UDR 100.

To explain further, in the VoLTE scope, the 2G/3G HLR-FE 34 and the HSS-FE (IMS-HSS-FE) 44 are two Application-FEs that store subscriber data into the UDR 100. The VoLTE telephony solution for 4G/LTE mobile access is based on 3GPP IMS Centralized Services (ICS) principles and Single-Radio Voice Call Continuity (SRVCC), as described in 3GPP TS 23.292, GSMA PRD IR.92 and IR.64 specifications. According to these, VoLTE subscribers using a VoLTE UE 40 (or a legacy 2G/3G UE 30) always get the telephony service from IMS and the MMTeI AS 42 service engine, for both LTE packet access and traditional CS based telephony. ICS with the Single Service Engine approach requires migration of the existing (CS domain) services and their data to IMS, i.e. Supplementary Services (SS) and other telephony-related subscriber services (e.g. ODBs, CSIs). Data for these should thus move from the 2G/3G HLR subscription towards the MMTeI telephony subscription for every VoLTE subscriber.

That is, according to the 3GPP and GSMA accepted VoLTE/ICS approach, from the moment a 2G/3G CS (and optionally General Packet Radio Service (GPRS)) enabled mobile subscriber such as the legacy UE 30 becomes VoLTE, IMS/MMTeI becomes the only/single telephony Service Engine for that mobile subscriber. As described in GSMA PRD IR.64 (also in 3GPP TS 23.292), Supplementary Services must not be provisioned or managed (activate/deactivate and/or register/erasure) with legacy CS TS 24.010 procedures for a VoLTE/ICS subscriber.

The ICS approach does not require synchronization of 2G/3G HLR and VoLTE data such as the first and second data sets 160a, 160b. However, many 2G/3G Telco operators are now moving to VoLTE request mechanisms to synchronize CS and VoLTE data sets containing similar/equivalent data. The main reasons are: 1) Avoiding BSS/OSS impacts: Operators want to keep current 2G/3G CS (HLR) based provisioning orders for 2G/3G subscriptions when VoLTE is introduced (the initial VoLTE phases have supplementary services identical to the services telephony in 2G/3G CS); 2) Maintaining existing service management procedures: Keep legacy UE service management procedures additional to VoLTE service management, e.g. in case of outbound roamers to 2G/3G VPLMNs where no roaming PS agreements exist (so Ut or Web based procedures for service management are not possible); 3) Supporting dual originating service engine solutions for VoLTE, e.g. in case of outbound roamers to 2G/3G VPLMNs where CAMEL ph2 roaming agreements have NOT been signed, thus preventing CAMEL based ICS solutions; and 4) Supporting dual terminating service engine solutions for VoLTE subscriptions.

Because of one or more of the listed reasons above it may not be enough to provide a double-provisioning based solution (on the BSS/CAS) side, as illustrated by BSS/CAS 46, 52) as modifications of pieces of common/shared data due to service management procedures initiated from the subscriber (i.e. from the legacy UE 30 side), must be propagated to both data sets 160a, 160b stored in the UDR 100. The data sets 160a, 160b are exemplarily illustrated in FIGS. 5 and 6 as a text document for VoLTE (second data set 160b), and a structured hierarchical LDAP tree (first data set 160a).

That is, even in case of ICS, data synchronisation of data sets 160a, 160b stored in the UDR 100 may not be required, but advantageous. However, there exist other examples according to which synchronisation between different data sets is even essential.

A possible solution to the need of data synchronisation between different data sets such as the first data set (which is in the following also referred to as CS/HLR data set 160a or CS/HLR profile 160a) and second data sets 160b (which is in the following also referred to as IMS/MMTeI data set 160b or IMS/MMTeI profile 160b) may be a functional entity external to the UDR 100 that coordinates and controls data changes to both sets of data 160a, 160b. This functional entity will be called data consistency controller in the following which is shown in FIGS. 6 and 7. Such data consistency controller may be implemented in a User Profile Gateway (UPG). UPG may be regarded as a specific implementation of the 3GPP Generic User Profile (GUP) standard, which shares user profile information with service and content providers in converged networks, while ensuring security and standardization to deliver personalized services.

As it is in the following assumed that the first 160a and second data sets 160b are distributed data sets 160a, 160b, the data consistency controller will in the following be referred to as DDCC (Distributed Data Consistency Controller) 200 as shown in FIGS. 6 and 7. The DDCC 200 of FIGS. 5 to 8, respectively, can be regarded as a specific type of the data consistency controller 200 of FIG. 1 (a data consistency controller for distributed data). In consequence, the UDR 100 is in the following regarded as a distributed database. Thus, the first 160a and second distributed data sets 160b are by way of example stored, respectively, in a distributed database, namely the UDR 100.

The DDCC 200 offers transactional characteristics to the distributed data sets 160a, 160b, for data change protocols with limited or no support for transaction handling. Examples of such protocols are the Lightweight Directory Access Protocol (LDAP) (used in UDC/UDR), Simple Object Access Protocol (SOAP), Representational State Transfer (REST) and the like.

LDAP is an application protocol for accessing and maintaining distributed directory information services over an Internet Protocol (IP) network. SOAP is a protocol specification for exchanging structured information in the implementation of Web Services in computer networks.

The DDCC 200 keeps track of which data sets that contain the same or similar data, such as the first and second data sets 160a, 160b, may be manipulated at the same time as a distributed transaction. This knowledge is solely in the DDCC 200 and relieving Application-FEs from having to know this.

To explain further, the DDCC 200 is configured to receive standard SOAP notifications triggered from the UDR 100 (through "Ud" reference point) for data-changes applied on a VoLTE/ICS related data set for one of the related telephony profiles (i.e. CS/HLR profile 160a as an example of the first data set 160a or IMS/MMTeI profile 160b as an example of the second data set 160b) and takes care of executing necessary data transformation and synchronization replicating those changes on the other data sets (IMS/MMTeI profile 160b or CS/HLR profile 160a), ensuring that both profiles are kept in-sync, i.e., synchronised with each other. As shown in FIGS. 6 and 7, The DDCC 200 is exemplarily implemented in the UPG. It can be noted that neither the HLR-FE 34 nor the MMTeI domain Application FEs (HSS-FE 44 and MTAS 42) are conscious of the need to synchronize data changes. This is handled by the DDCC 200.

When referring to FIGS. 6 and 7, a HLR SS Data Update (24.010 procedure) is requested from the 2G/3G UE 30, by way of example. The HLR-FE 34 performs the required LDAP modifications on the CS telephony data set 160a and finally asks the UDR 100 to commit those changes. Once these changes have been applied (i.e. committed) on the UDR 100, a SOAP notification is triggered from the UDR 100 towards the UPG, more precisely the DDCC 200, informing about those performed changes so now the UPG, more precisely the DDCC 200, can replicate those updates on the IMS/MMTeI data set 160b through a new set of LDAP requests, e.g., as a set of LDAP modifyRequest operations. These LDAP modifyRequest operations can be grouped in a single LDAP transaction (according to RFC 5805) so all those modifications can be performed atomically when the LDAP commit order is finally requested (included into an LDAP endTransactionRequest operation).

However, according to the solution described with respect to FIGS. 6 and 7 (Supplementary Services Data Synchronization solution), there remains the lack of a consistent mechanism to assure, in a concurrent environment, that the changes in both profiles (data sets) 160*a*, 160*b* are performed atomically, i.e. assuring that data changes are atomically applied in both profiles or in none of them. It is desirable to avoid that the changes are committed in one of the profiles, e.g., data set 160*a*, but rejected in the other such as data set 160*b*. For example, there may be some temporal DBMS errors when trying to update the IMS/MMTeI profile 160*b* after having previously committed the equivalent changes in the CS/HLR profile 160*a*. This will lead to a situation where the data in the two data sets 160*a*, 160*b* which are required to be always in synch will be indeed not synchronised (or inconsistent) with each other as shown in FIG. 7. In the present context, the term inconsistent is to be understood in such a manner that the two data sets do not correspond to each other, rather than in the sense of consistency according to the ACID characteristics.

Figure 8:
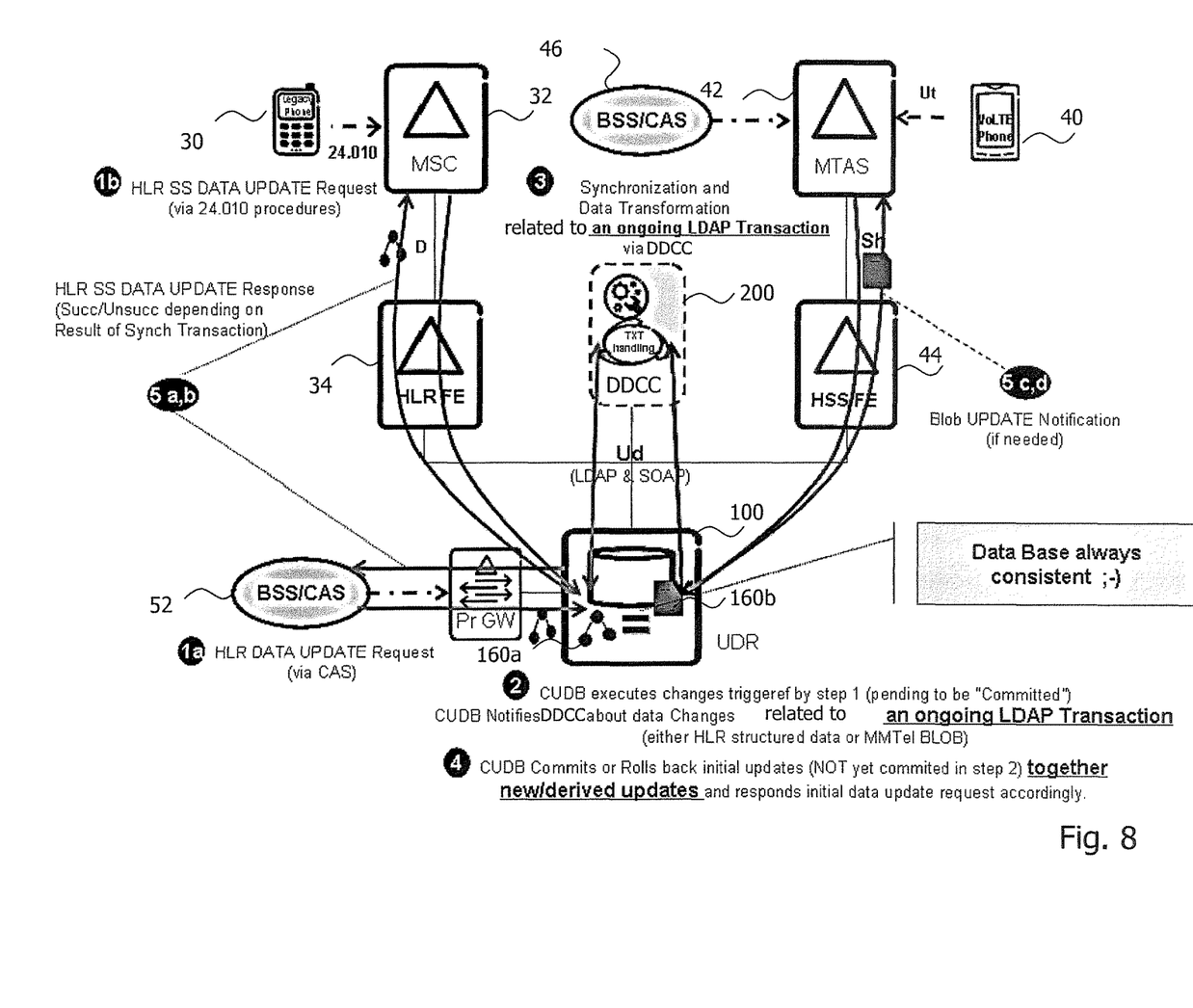
FIG. 8 shows a schematic illustration of data synchronization performed in the the UDC concept environment of FIG. 6 by means of the data repository according to the device embodiment of FIG. 1 and the data consistency controller according to the device embodiment of FIG. 1.

With respect to FIG. 8, a mechanism supported by an adjusted Distributed Data Consistency Controller (DDCC) 200 is proposed as described above with respect to FIGS. 1 to 3. That is, the DDCC 200 of FIG. 8 differs from the DDCC 200 from FIGS. 6 and 7 in some additional/different functionality which has been set out with respect to FIGS. 1 to 3. Likewise, the UDR 100 of FIG. 8 differs from the UDR 100 from FIGS. 6 and 7 in some additional/different functionality which has been set out with respect to FIGS. 1 to 3. The data sets 160*a*, 160*b* of FIG. 8 on the one hand and the data sets 160*a*, 160*b* of FIGS. 6 and 7 on the other hand may be the same or different from each other. The mechanism as described with respect to FIG. 8 is based on the mechanism described with respect to FIGS. 1 to 3 above and provides ACID characteristics to the whole set of updates involving the CS/HLR 160*a* and IMS/MMTeI data sets 160*b* (CS/HLR 160*a* and IMS/MMTeI profiles 160*b*).

The DDCC 200 can be used in 3GPP UDC, but also in other data management solutions. It is assumed by way of example in the following that the DDCC 200 is implemented in UPG. The DDCC 200 complements the functions of the previously mentioned DDCC 200 by ensuring that the synchronization of the data changes applied in the first data set 160*a* to the second data set 160*b* are performed into the scope of the same transaction, e.g. an LDAP transaction as used in UDC/UDR.

To illustrate the functionality of the DDCC 200 and the UDR 100, an example with respect to 24.010 Service Management is used in the following. A 2G/3G UE 30 manipulates a data setting for a specific SS of the CS/HLR data set 160*a*. The HLR-FE 34 requests the UDR 100 to commit the data manipulations on the CS/HLR data set 160*a*. The same LDAP transaction requested by the HLR-FE 34 to change the data in the UDR 100, will be reused by the UPG, more precisely the DDCC 200, to set the same or corresponding status into the MMTeI profile 160*b*. When the LDAP transaction is finally committed in the UDR 100 it will involve all applied changes, i.e. the ones requested from the HLR-FE 34 side plus the ones requested from UPG.

In order to explain the mechanism in more detail, SOAP and LDAP are used as exemplary protocols in the following.

In a first step, an SOAP based notification event message ("notification-event") is triggered by the UDR 100 to notify the reception of a commit order. The commit order may be the one mentioned above, namely the commit order requested by the 2G/3G UE 30 to manipulate a data setting for a specific SS of the CS/HLR data set 160*a*. The notification event message is triggered before committing the modifications requested in the ongoing LDAP transaction. As mentioned above, the ongoing LDAP transaction may have been originally started by the 2G/3G UE 30 and the HLR-FE 34 by requesting data changes on the CS/HLR data set 160*a*. The notification event message includes the transaction identifier ("transaction-id") assigned by the UDR 100 to the involved (ongoing) LDAP transaction.

The UDR 100 can manage the triggering of the notification event message in a similar way as UDR manages today notification of data changes. One difference is that currently supported notifications of data changes in UDR are triggered after modifications are committed while for the UDR 100, the notification event message is triggered before committing the modifications. In line with this approach, it may be possible that the UDR 100 is configured to trigger the notification event message only upon data modification of specific data. Similarly, the UDR 100 is able to send the notification event message to specific end points, in the present example, the DDCC 200.

In response to the receipt of the notification event message, the DDCC 200 triggers transmission of an SOAP based notification event response message ("notification-event-response") supported by the UDR 100 as a required response to the notification event message ("notification-event") described above. The notification event response message includes a mandatory indication (to the UDR 100) to continue or reject the commit order that triggered the previous "notification-event" being now answered. That is, the DDCC 200 will respond to the notification event message with the "notification-event-response" including a mandatory continue or reject indication, e.g., depending on the result of the LDAP operations realizing the data transformation and synchronization.

In case the "notification-event-response" contains the continue indication, the UDR 100 tries to commit the modifications that were originally requested into the involved (ongoing) LDAP transaction. In case the "notification-event-response" contains the reject indication, the UDR 100 automatically rolls back all the modifications that were originally requested in the involved (ongoing) LDAP transaction and so rejects the commit order originally received.

The transaction identifier mentioned above facilitates to allow the entity being notified, i.e., the DDCC 200, the possibility to request/add new LDAP updates into the scope of this ongoing/not-yet-committed LDAP transaction. That is, a mechanism in the UDR 100 may be provided to allow the DDCC 200 (being notified with the new "notification-event" described above) to include new LDAP modifyRequest, addRequest, deleteRequest and/or modifyDnRequest operations into the scope of the ongoing LDAP transaction that have not been originally requested by the 2G/3G UE 30. That is, the DDCC 200 may be configured to modify the data changes, to add further data changes, and to delete at least a subset of the data changes. Upon receipt of the notification event message, the DDCC 200 may perform data mapping functionality needed to create LDAP operations realizing the actual data transformation and synchronization. The DDCC 200 ensures that these LDAP operations are handled in the context of the same ongoing LDAP transaction for which a distributed commit confirmation was required to the DDCC 200 with the notification event.

If the DDCC 200 has added some additional modifications, then, in case the "notification-event-response" contains the continue indication, the UDR 100 tries to commit the modifications that were originally requested into the involved LDAP transaction plus, the eventually added additional modifications included into the LDAP transaction by the DDCC 200. In case the "notification-event-response" contains the reject indication, the UDR 100 automatically rolls back all the modifications that were originally requested in the involved LDAP transaction plus whatever new modification added by the DDCC 200, and so rejects the commit order originally received. In both cases, the first and second data sets 160*a*, 160*b* remain synchronized with each other.

Finally, the UDR 100 may inform the MSC 32 and the MMtel AS 42 about the result of the transaction. For example, the UDR 100 informs the MSC 32 that the HLR SS Data Update was successful or unsuccessful. Likewise, the UDR 100 may inform the MMTeI AS 42 about the updates on the MMTeI profile 160*b*. For example, a Blob Update notification may be used for the latter.

The DDCC 200 is generically applicable also for other use cases differing from the specific example explained with respect to FIG. 8. That is, it is not restricted to VoLTE/ICS which is only presented as an example for explanation rather than limitation. For example, the data sets 160, 160*b* may be stored in the same backend (e.g., UDR 100), or may reside in different back ends. The DDCC 200 can also be used during migration from monolithic HLRs to layered, where the DDCC 200 updates data in a classic HLR with an integrated database, if changes occur in UDC for a layered VoLTE solution.

The mechanism explained with respect to FIG. 8 provides a generic solution and mechanism that provides at least one of: allowing applications to share data that exists in several data sets in a controlled manner; increasing data quality by synchronizing copies of data, and controlling how changes to these are committed; providing transactional capabilities when protocols with limited or no transactional capabilities are used; and shielding Application-FEs from having to know and understand dependencies between data sets used by other Application FEs.

The invention claimed is:

1. A method of synchronising a first data set and a second data set stored in a data repository, the method comprising the steps of:
    triggering, by the data repository, in response to a commit order relating to an ongoing transaction requested by a client and instructing the data repository to apply one or more data modifications on the first data set, transmission of a notification event message relating to the ongoing transaction to a data consistency controller;
    receiving, by the data consistency controller, the notification event message triggered by the data repository;
    transmitting, by the data consistency controller, a notification event response message relating to the ongoing transaction to the data repository, the notification event response message indicating to the data repository whether
    to commit the one or more data modifications instructed by the commit order on the first data set and one or more corresponding data modifications on the second data set, or
    to roll back the one or more data modifications instructed by the commit order on the first data set;
    receiving, by the data repository, the notification event response message relating to the ongoing transaction from the data consistency controller; and
    receiving, by the data repository, one or more request messages relating to the ongoing transaction from the data consistency controller, the one or more request messages requesting the data repository to apply one or more additional data modifications on the first data set and one or more corresponding additional data modifications on the second data set.

2. The method of claim 1, the method further comprising the steps of:
    committing, by the data repository, the one or more data modifications instructed by the commit order on the first data set and the one or more corresponding data modifications on the second data set, or
    rolling back, by the data repository, the one or more data modifications instructed by the commit order on the first data set,
    depending on the indication by the notification event response message.

3. The method of claim 2, the method further comprising the step of committing, by the data repository, all data modifications relating to the ongoing transaction including the one or more additional data modifications on the first data set as well as all corresponding data modifications including the one or more corresponding additional data modifications on the second data set.

4. The method of claim 1, wherein the step of triggering the transmission of the notification event message is performed only if the commit order instructs the data repository to apply the one or more data modifications on specific data of the first data set.

5. The method of claim 1, wherein the method further comprises the step of including, by the data repository, a transaction identifier identifying the ongoing transaction into the notification event message.

6. The method of claim 1, wherein the method further comprises the step of reporting, by the data repository, a report message to the client, the report message indicating to the client whether the one or more data modifications on the first data set as instructed by the commit order, were committed or rolled back.

7. The method of claim 1, wherein the notification event message and the notification event response message are based on Simple Object Access Protocol (SOAP) and/or the ongoing transaction is a Lightweight Directory Access Protocol (LDAP) transaction.

8. The method of claim 1, wherein the first data set comprises data for circuit switched (CS) services and the second data set comprises data for IP Multimedia Subsystem (IMS) services.

9. The method of claim 1, wherein the first data set and the second data set are distributed data sets, the data repository is a distributed data repository, and the data consistency controller is a Distributed Data Consistency Controller (DDCC).

10. A method of supporting synchronisation of a first data set and a second data set stored in a data repository, the method comprising the steps of:
    triggering, by the data repository, in response to a commit order relating to an ongoing transaction requested by a client and instructing the data repository to apply one or more data modifications on the first data set, transmission of a notification event message relating to the ongoing transaction to a data consistency controller;
    receiving, by the data repository, a notification event response message relating to the ongoing transaction from the data consistency controller, the notification event response message indicating to the data repository whether
    to commit the one or more data modifications instructed by the commit order on the first data set and one or more corresponding data modifications on the second data set, or
    to roll back the one or more data modifications instructed by the commit order on the first data set; and receiving, by the data repository, one or more request messages relating to the ongoing transaction from the data consistency controller, the one or more request messages requesting the data repository to apply one or more additional data modifications on the first data set and one or more corresponding additional data modifications on the second data set.

11. A data repository for supporting synchronisation of a first data set and a second data set stored in the data repository, the data repository being configured to perform the method according to claim 10.

12. A method of controlling synchronisation of a first data set and a second data set stored in a data repository, the method comprising the steps of:
  receiving, by a data consistency controller, a notification event message triggered by the data repository in response to a commit order relating to an ongoing transaction requested by a client and instructing the data repository to apply one or more data modifications on the first data set;
  transmitting, by the data consistency controller, a notification event response message relating to the ongoing transaction to the data repository, the notification event response message indicating to the data repository whether
    to commit the one or more data modifications instructed by the commit order on the first data set and one or more corresponding data modifications on the second data set, or
    to roll back the one or more data modifications instructed by the commit order on the first data set; and
  transmitting, by the data consistency controller, one or more request messages relating to the ongoing transaction to the data repository, the one or more request messages requesting the data repository to apply one or more additional data modifications on the first data set and one or more corresponding additional data modifications on the second data set.

13. A data consistency controller for controlling synchronisation of a first data set and sa econd data set stored in a data repository, the data consistency controller being configured to perform the method of claim 12.

14. A data repository for supporting synchronisation of a first data set and a second data set stored in the data repository, the data repository comprising:
  a triggering component configured to trigger, in response to a commit order relating to an ongoing transaction requested by a client and instructing the data repository to apply one or more data modifications on the first data set, transmission of a notification event message relating to the ongoing transaction to a data consistency controller; and
  a receiving component configured to:
    receive a notification event response message relating to the ongoing transaction from the data consistency controller, the notification event response message indicating to the data repository whether
      to commit the one or more data modifications instructed by the commit order on the first data set and one or more corresponding data modifications on the second data set, or
      to roll back the one or more data modifications instructed by the commit order on the first data set; and
    receive one or more request messages relating to the ongoing transaction from the data consistency controller, the one or more request messages requesting the data repository to apply one or more additional data modifications on the first data set and one or more corresponding additional data modifications on the second data set.

15. The data repository of claim 14, the data repository being configured as a distributed data repository.

16. The data repository of claim 14, wherein the data repository is configured as a User Data Repository (UDR) in a User Data Convergence (UDC) environment.

* * * * *